UNITED STATES PATENT OFFICE.

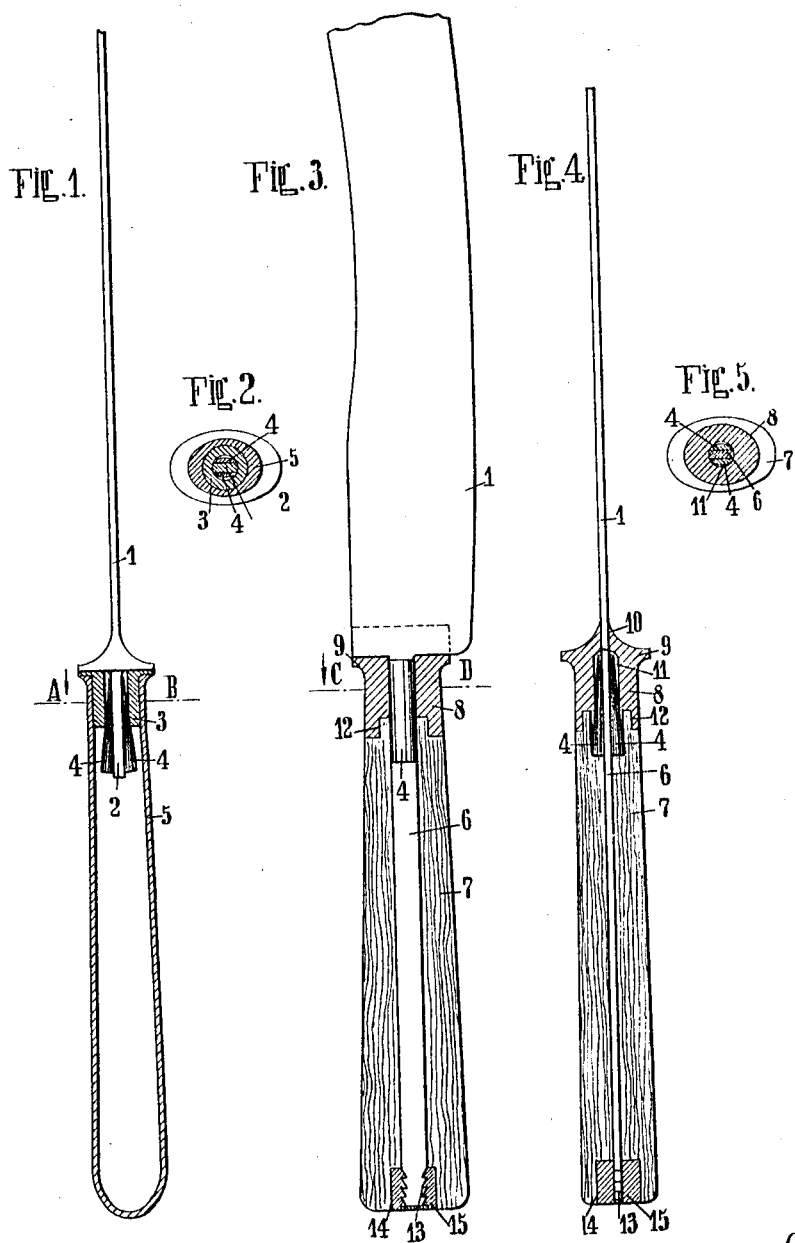

ROBERT LANGE, OF WILMERSDORF, NEAR BERLIN, GERMANY.

CONNECTION OF HANDLES TO THE TANGS OF INSTRUMENTS.

1,118,360.   Specification of Letters Patent.   Patented Nov. 24, 1914.

Application filed June 24, 1913. Serial No. 775,583.

*To all whom it may concern:*

Be it known that I, ROBERT LANGE, a citizen of the German Empire, and residing at Wilmersdorf, near Berlin, Germany, have invented certain new and useful Improvements in Connections of Handles to the Tangs of Instruments, of which the following is a specification.

My invention relates to instruments comprising a tang and a handle, *e. g.* tablecutlery, and a primary object is to improve the separable joint between tang and handle. As compared with the known constructions of this kind the joint between tang and handle according to my present invention has been modified and perfected in such a manner that instead of fastening the tang into the bore in the handle I now drive wedges at the rear end of the tang into the space unoccupied by the tang in the bore.

A further improvement consists in the bore in the bolster for the tang being made only such a length that it runs into that groove or slot in the bolster which safeguards the blade from turning.

Two illustrative embodiments of my invention are represented by way of example in the accompanying drawing, wherein:—

Figure 1 is an edge elevation partly in section, showing the first form of joint, and Fig. 2 is a cross-section taken on the line A—B in Fig. 1; Figs. 3 and 4 are side and edge elevations, respectively, partly in section, showing the second form of joint, and Fig. 5 is a cross-section taken on the line C—D in Fig. 3.

Referring firstly to Figs. 1 and 2, the blade 1 is rigidly connected to the tang 2. 3 represents a collar surrounding the tang with substantial clearance. Wedges 4, 4 are driven in on both sides of the tang and wedge the tang fast in the collar. It is preferable to fill the crevices between the wedges and the collar with solder. The collar 3 with the tang attached thereto is then inserted in known manner into the handle and soldered fast to the latter. The collar 3 then constitutes part of the bolster of the blade 1.

Referring now to Figs. 3 to 5, the blade 1 is rigidly connected to a tang 6 extending the entire length of the wooden handle 7. The upper portion 9 of the bolster or collar 8 has a transverse slot 10 which receives the lower portion of the blade. The lower portion of the bolster, *i. e.* at that portion remote from the slot 10, has a cavity 11 which is open below and serves to receive the wedges 4, 4. The said cavity does not extend through the bolster 8 but only sufficiently far to meet the slot 10 which is preferably milled in the portion 9 of the bolster. The cavity 11 in the bolster 8 is enlarged at its lower end, and forms a recess 12 of such dimensions that the bolster can be employed as a ferrule for the handle 7. The tang 6 is fastened in the bolster 8 by means of wedges 4, 4 in the same manner as in the embodiment shown in Figs. 1 and 2.

In order to fasten the tang 6 in the wooden handle 7, the former has at its end saw-teeth 13 and the latter has at its corresponding end a recess 14, in which the tang is fastened by pouring in a readily fusible metallic composition 15 of lead or similar material, so that the saw-teeth 13 on the tang 6 are surrounded and securely held by the metallic composition.

I may, of course, fasten the handle and tang together by some other method, *e. g.* by screwing or riveting.

I claim:—

1. The combination with a blade having a tang, of a bolster having a cavity of a cross-section larger than that of said tang and surrounding the same with clearance, wedges located in said clearance between said tang and bolster, the thick ends of the wedges being remote from the blade, a metallic composition adapted to melt at a comparatively low temperature, and to fill the remainder of said clearance between said tang and bolster, and a handle supported by said bolster.

2. The combination with a blade having a tang, of a bolster having a transverse slot at one end for receiving the blade, and a cavity extending from its other end as far as said slot and surrounding said tang, the cross-section of said cavity being larger than that of said tang, wedges located between said tang and bolster, the thick ends of said wedges being remote from the blade, a metallic composition adapted to melt at a comparatively low temperature and to fill the remaining spaces between said tang and bolster, and a handle supported by said bolster.

In testimony whereof, I affix my signature in the presence of two witnesses.

ROBERT LANGE.

Witnesses:
HENRY HASPER,
WOLDEMAR HAUPT.

Copies of this patent may be obtained for five cents each, by addressing the "Commissioner of Patents, Washington, D. C."